United States Patent [19]
Block et al.

[11] Patent Number: 5,104,092
[45] Date of Patent: Apr. 14, 1992

[54] BALL VALVE WITH IMPROVED SEALING APPARATUS

[75] Inventors: Gary C. Block, Carnegie; Gary W. Friedline, New Alexandria, both of Pa.

[73] Assignee: PBM, Inc., Irwin, Pa.

[21] Appl. No.: 678,476

[22] Filed: Apr. 1, 1991

[51] Int. Cl.⁵ ............................................. F16K 51/00
[52] U.S. Cl. .................................. 251/152; 251/214; 251/315; 137/468
[58] Field of Search ............... 251/315, 214, 148, 152, 251/368; 137/468

[56] References Cited

U.S. PATENT DOCUMENTS

| | | | |
|---|---|---|---|
| 3,731,904 | 5/1973 | Valince | 251/315 |
| 3,770,004 | 11/1973 | Johnson et al. | 137/606 |
| 4,006,881 | 2/1977 | Gaillard | 251/214 |
| 4,099,705 | 7/1978 | Runyan | 251/315 |
| 4,113,229 | 9/1978 | Fujiwara | 251/315 |
| 4,538,790 | 9/1985 | Williams et al. | 251/214 |
| 4,558,874 | 12/1985 | Williams et al. | 251/214 |

*Primary Examiner*—A. Michael Chambers
*Attorney, Agent, or Firm*—Kirkpatrick & Lockhart

[57] ABSTRACT

A ball valve adapted to be used in applications where the temperature of the liquid medium is subjected to various swings in temperature. The valve includes a valve body which is retained between a pair of end connectors to create a valve chamber therebetween. A flow control member having a passage therethrough is rotationally supported within the valve chamber. A valve stem extends into the valve body and is operatively connected to the flow control member. O-rings are affixed in annular fashion to a neck portion of each end connector for creating a fluid-tight seal between the valve body and the end connectors. Flanged packing seals extend around the valve stem within the valve body and are spring biased to provide axial support to the valve stem while creating a fluid-tight seal between the valve body and the stem. A handle member is connected to the valve stem for rotating the flow control member within the valve chamber.

15 Claims, 5 Drawing Sheets

BALL VALVE WITH IMPROVED SEALING APPARATUS

BACKGROUND OF THE INVENTION

1. Field of the Invention

The present invention relates to ball valves and, in particular, to ball valves for use with fluid mediums having large variations in temperature.

2. Description of the Invention Background

Ball valves are well known in the fluid control industry and are generally used to control the flow of a myriad of liquids ranging from water to unrefined oil. Because a ball valve may be fully opened or closed by a relatively short rotational turn of its stem, it is well adapted to be actuated by a variety of rotary actuators and, therefore, is frequently chosen over gate valves in applications where process automation is desired.

Conventional ball valves, however, are notorious for having inherent leakage problems, and thus, their use in various applications where no leakage can be tolerated has generally been avoided. In the past, small valve leaks were generally expected and accepted when using ball valves. Today however, due to various governmental regulations and environmental concerns, many industries cannot tolerate any leakage in their piping systems. For example, manufacturers handling hazardous chemicals can not safely use valves that permit the chemicals to leak into the plant environment.

This leakage problem is generally amplified when the ball valve is used in systems handling various fluid mediums having significant variations in temperature. For example, in the dairy and food processing industries, steam is admitted into the piping system to clean and disinfect the system. The steam has a much higher temperature than the food or milk product normally transported therein. As such, the valve experiences a significant change in temperature which causes the seals and the valve body to expand and contract. It has been observed that the seals do not expand and contract at the same rate as the valve body. The difference in the rates of expansion between the two material's when subjected to temperature extremes produces a gap therebetween. The fluid medium is then free to exit the system through these gaps in the valve's seal structure. In addition, harmful bacteria may also invade the piping system through the gaps to contaminate the entire system.

The leakage problems encountered in conventional ball valves can be attributed to their basic design and sealing structure. A prior art ball valve, designated as 210, is illustrated in FIG. 1. Ball valve 210 generally consists of a valve body 212 and end fittings 214 and 216. End fittings 214 and 216 have passages 218 and 220 therein and are adapted to be connected to two corresponding mounting flanges provided in the pipeline (not shown).

A valve chamber 222 is provided within valve body 212 which rotatably houses ball member 224. Ball member 224 has an axial port 225 therethrough that substantially corresponds with passages 218 and 220 in end fittings 214 and 216. A valve stem 232 extends through a bore 234 provided in valve body 212 and is non-rotatably received in a rectangular socket 230 located in the top of ball member 224. The valve 210 is operated in a well known manner by rotating valve stem 232 by a handle 250 or a rotary actuator (not shown) which in turn rotates ball member 224 within valve chamber 222.

By rotating ball member 224 so that port 225 aligns with passages 218 and 220, the liquid medium is permitted to pass therethrough. To stop the liquid flow, ball member 224 is rotated so that port 225 is at a right angle with respect to passages 218 and 220.

To inhibit liquid leakage through valve 210, a number of seals are provided. In particular, valve seats 226 and 228 are positioned on opposite sides of ball member 224 to seal the joints between ball member 224 and end fittings 214 and 216. Ball member 224 is mounted within valve chamber 222 in sliding engagement with valve seats 226 and 228. To inhibit fluid leakage along the valve stem 232, a stem seal 236, fabricated from material such as a tetrafluoroethene, available from E. I. duPont deNemours & Co. under the trademark Teflon, is provided around valve stem 232 within bore 234. Teflon can be extruded at a temperature of approximately 400° F. and has a useful temperature range of approximately −100° F. to +480° F. At temperatures greater than 480° F., the Teflon seals begin to degrade.

A metal gland ring 238 is slidably received on valve stem 232 between stem seal 236 and flange 239 located on valve stem 232. Gland ring 238 is adapted to engage and compress stem seal 236. A gland nut 240, having a smooth bore 242 therethrough, is threadably received in threaded bore 235. Valve stem 232 extends through smooth bore 242 and is free to rotate therein. As leakage is encountered along valve stem 232, gland nut 240 is further threaded into threaded bore 235 causing gland ring 238 to compress stem seal 236. As stem seal 236 is compressed, it is forced against valve stem 232, thereby inhibiting the passage of the liquid along valve stem 232. This action, while inhibiting fluid leakage past valve stem 232, increases the amount of torque required to actuate the valve due to the amount of force pressing against the valve stem 232. Also, opening and closing valve 210 tends to cause gland nut 240 to back out of threaded bore 235 thereby increasing the likelihood of fluid leakage.

To inhibit the passage of fluid between valve body 212 and end fittings 214 and 216, body gaskets 244 and 246 are provided therebetween. Gaskets 244 and 246 are fabricated from Teflon material and have two relatively flat bearing surfaces for mating against the respective end fitting 214 or 216 and valve body 212.

It is a well known physical principle that all solids expand in volume when their temperatures are increased. The change in any linear dimension of the solid, such as its length, width or thickness, is called a linear expansion. The rate of linear expansion of a particular material is based primarily upon the material's atomic structure and can be predicted by mathematical equations. For example, it is well known in the art that Teflon expands at a rate approximately eight times greater than the rate at which stainless steel expands when exposed to the same increase in temperature. Therefore, when the ball valve 210 is exposed to a high temperature medium such as steam, the linear expansion of Teflon gaskets 244 and 246 will be approximately eight times greater than the linear expansion of valve body 212 and end fittings 214 and 216. Conversely, when a cooler liquid is thereafter introduced into valve 210, Teflon gaskets 244 and 246 along with valve body 212 and end fittings 214 and 216 contract in much the same manner. However, it is well known that for temperature changes in the range of 480° F. or greater, Teflon does not return to its original shape. Therefore, as gaskets 244 and 246 are heated and then cooled at temperature swings of 200° F. or greater, liquid is permitted to pass between end fittings 214 and 216 and valve body 212 due to the failure of gaskets 244 and 246 to assume their original shape.

Thus, there is a need for a ball valve with an improved sealing structure that can be used in systems handling liquids having temperature swings of 200° F. or greater.

SUMMARY OF THE INVENTION

In accordance with the present invention, there is provided an improved design for a ball valve for use in systems handling liquids that are subjected to great variations in temperature. The ball valve includes a valve body having two open ends and a first bore therethrough. An end connector, adapted to be attached to a pipeline by known attachment means, is provided at each open end of the valve body. The end connectors each act in concert with the valve body to define a seat receiving surface at their points of connection. A flow control member having an opening therethrough is rotatably mounted within the valve body to control the flow of fluid through the valve. The flow control member is supported within the valve body by seat members that are positioned on the seat receiving surfaces located in the end connectors. The seat members are made of a material which expands and contracts at about the same rate as the flow control member and the end connectors.

In addition, the valve body preferably has a counterbored portion on each open end that is adapted to receive a neck portion located on each of the end connectors. A sealing means, such as an O-ring, are preferably retained within an annular groove located on each of the neck portions of the end connectors in confronting relationship with one of the counterbores located on the valve body to provide a fluid-tight seal between each end connector and the valve body. A valve stem is operatively connected to the flow control member at one end thereof and to either a manual or an automated actuating means at the other end. A plurality of spring-biased, flanged packing seals are preferably slidably received around the valve stem to provide a fluid-tight seal and bearing surface between the valve stem and the valve body while additionally providing axial support to the valve stem.

Accordingly, the present invention provides solutions to the aforementioned problems encountered when using ball valves with liquid mediums that are subject to variations in temperature. One preferred embodiment of this invention provides seat members that are adapted to expand and contract with the flow control member and the end connectors while maintaining a fluid-tight seal therebetween. In addition, a preferred embodiment of this invention includes a packing seal assembly that provides a fluid-tight interface and a bearing surface between the valve stem and the body while providing axial support to the valve stem. The packing assembly is also spring biased to compensate for the expansion and contraction of the various valve components during operation. Moreover, the present invention allows the packing seals to be adjusted without increasing the torque necessary to operate the valve. These and other details, objects and advantages of the invention will become apparent as the detailed description of the present invention proceeds.

BRIEF DESCRIPTION OF THE DRAWINGS

For the present invention to be clearly understood and readily practiced, the preferred embodiment will now be described, by way of example only, with reference to the accompanying figures wherein.

DETAILED DESCRIPTION OF THE PREFERRED EMBODIMENT

Figure 1:
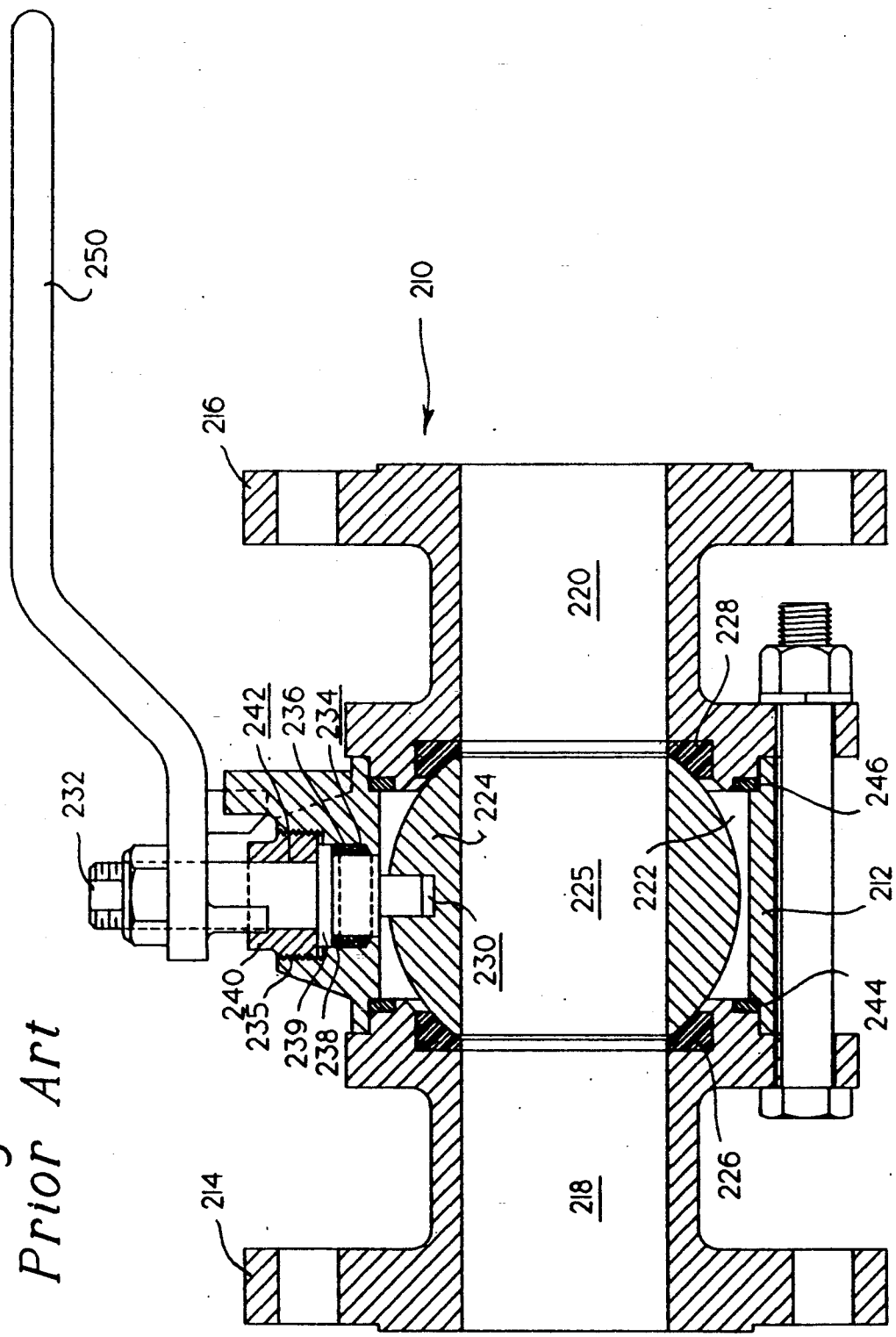
FIG. 1 is a cross-sectional view of a ball valve assembly of the prior art.

Referring now to the drawings which are for purposes of illustrating the present preferred embodiment of the invention only and not for purposes of limiting the same, the figures show a ball valve assembly, generally designated as 10, constructed according to the teachings of the present invention.

Figure 2:
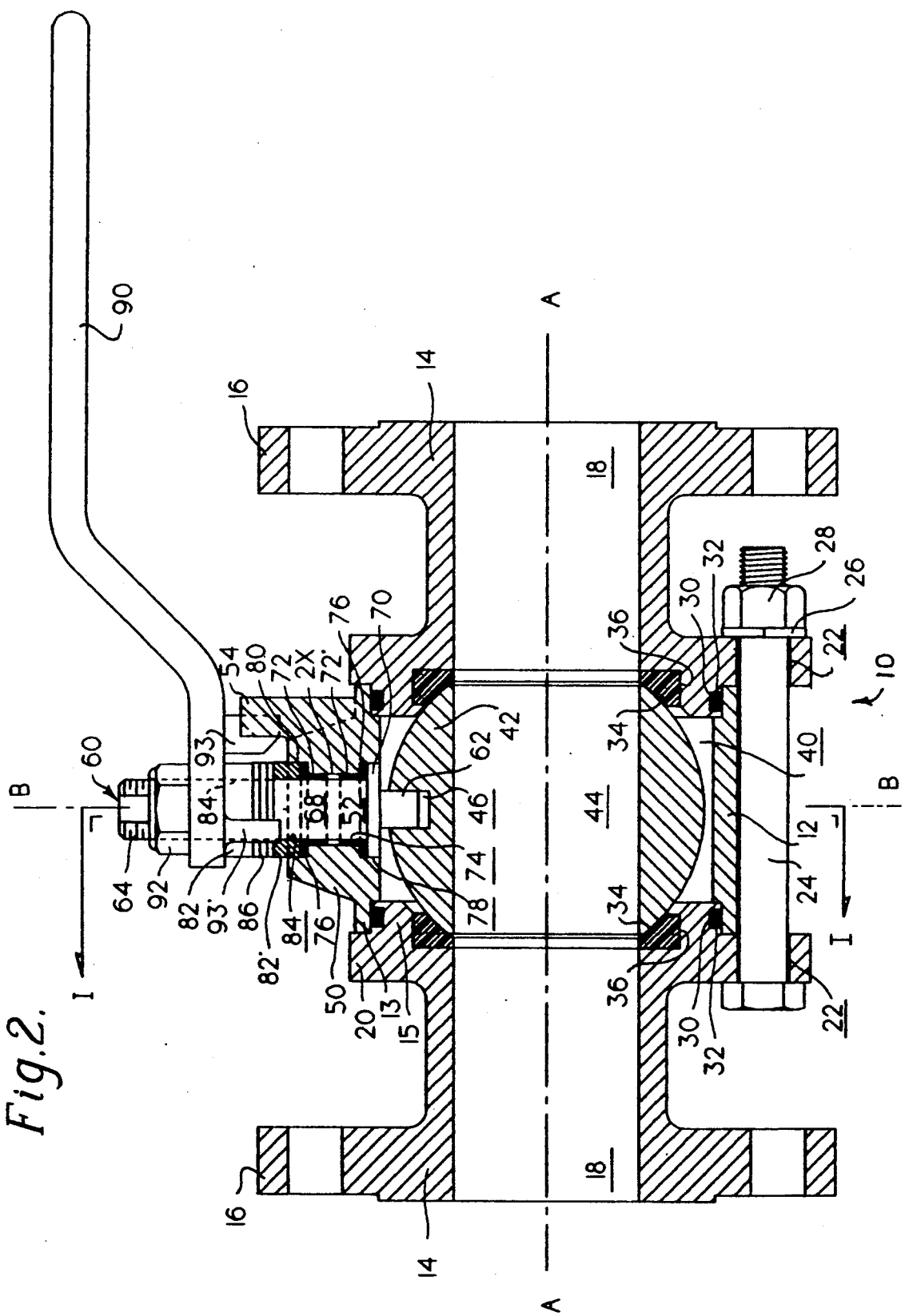
FIG. 2 is a longitudinal cross-sectional view of the present invention.
Figure 3:
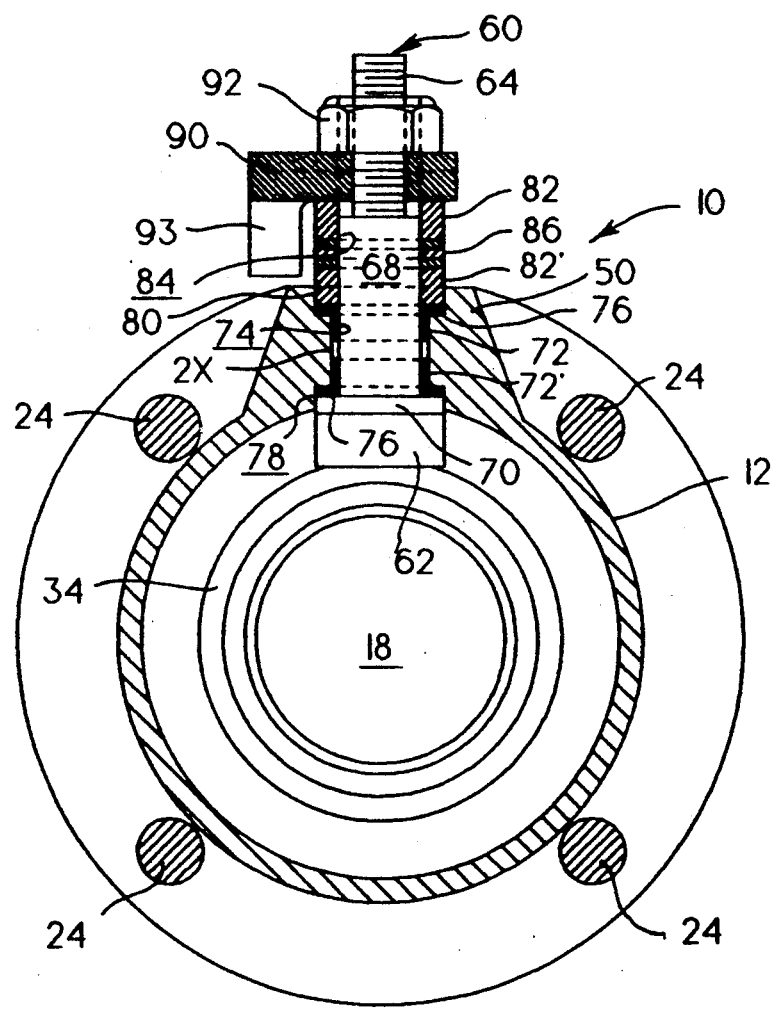
FIG. 3 is a cross-sectional end view of the present invention taken along line I—I.
Figure 4:
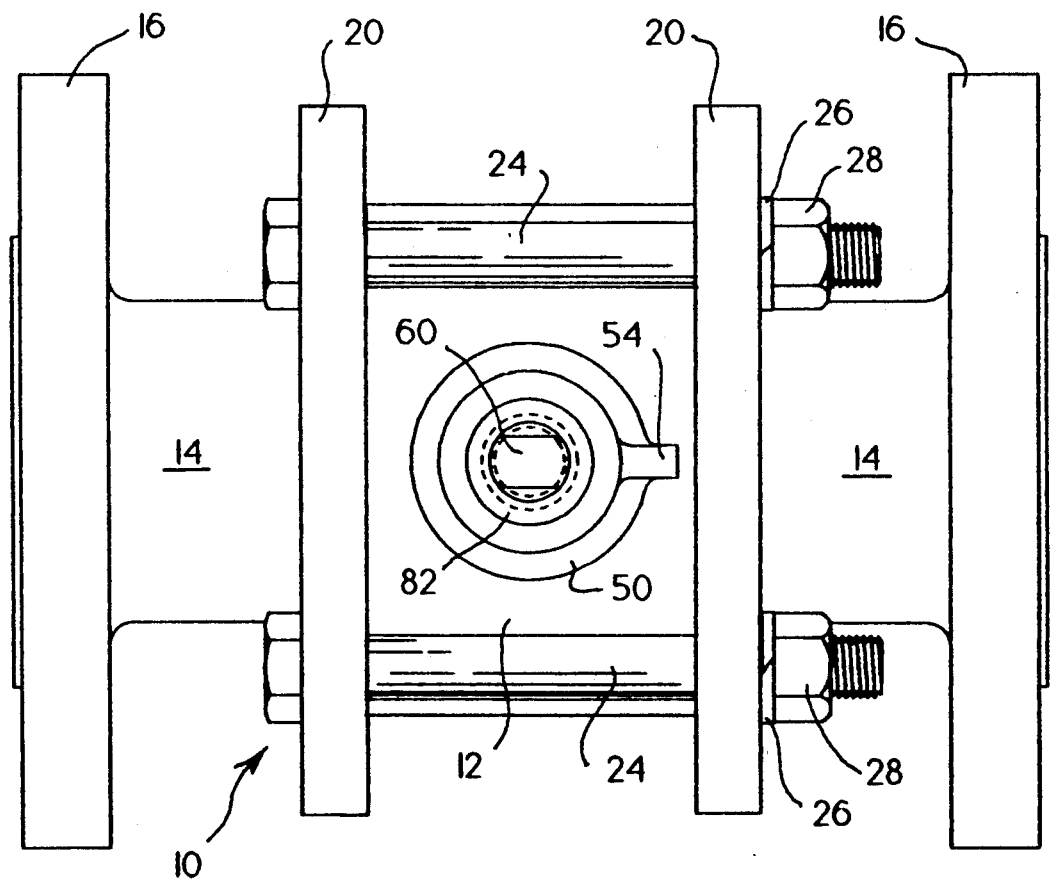
FIG. 4 is a top view of the valve body of the present invention.
Figure 5:
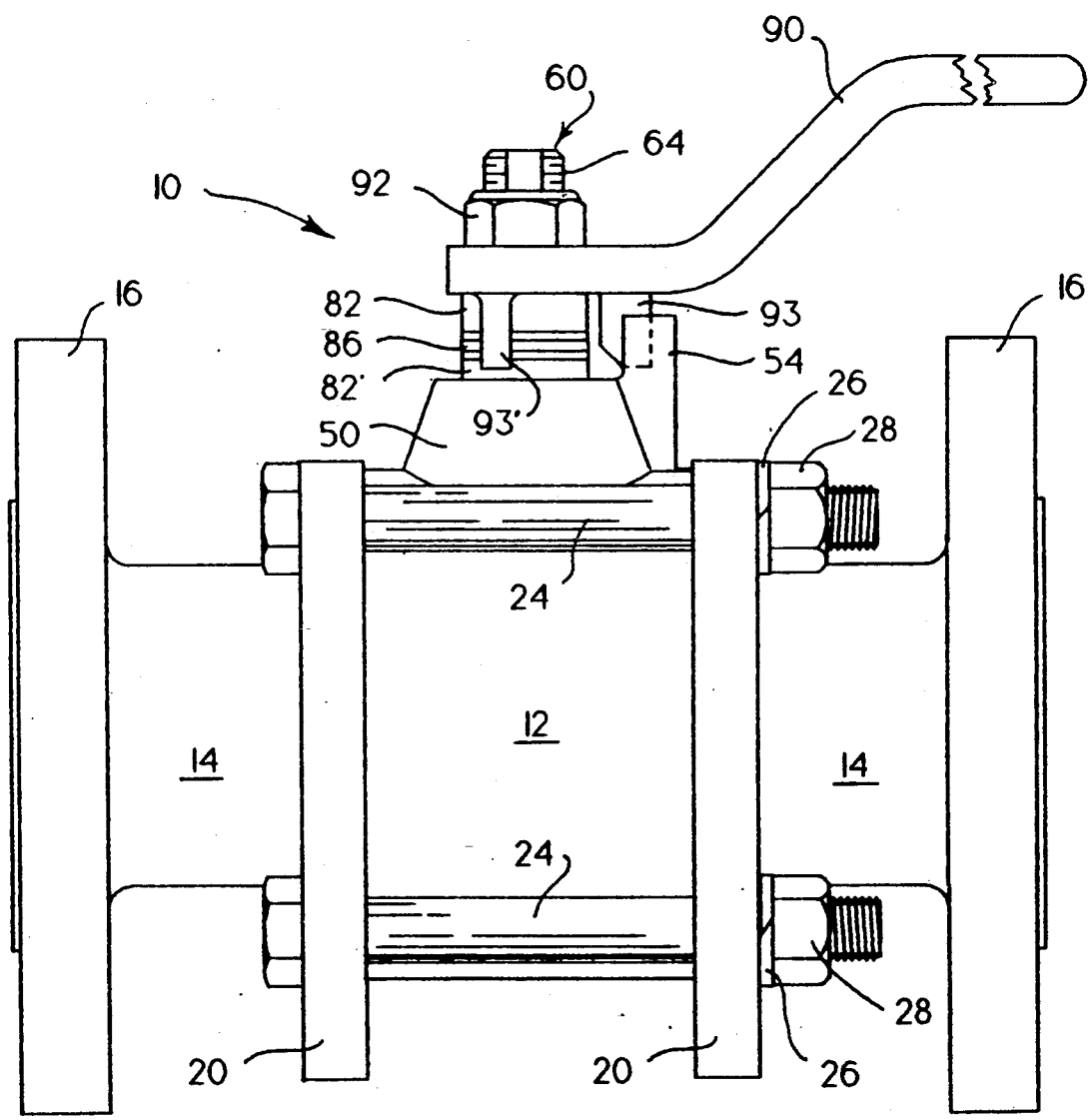
FIG. 5 is a side view of the ball valve of the present invention. invention.

More particularly and with reference to FIGS. 2, 3, and 4, there is shown a ball valve 10 which may be installed, for example, in a steam line (not shown). The ball valve 10 consists of a body member 12 and two end connectors 14. It will be recognized that body member 12 and end connectors 14 may be constructed out of a myriad of materials such as stainless steel, carbon steel, cast iron or bronze depending upon the material's compatibility with the liquid medium being handled. In the preferred embodiment of the present invention, end connectors 14 have an outer flanged portion 16 and a smooth bore 18 therethrough that extends along axis A—A to substantially correspond with the inner diameter of the corresponding pipeline. Outer flanges 16 are adapted to be connected to ordinary flange fittings provided in the pipeline. However, it will be understood by one of ordinary skill in the art that end connectors 14 may be easily adapted to receive welded or threaded fittings to facilitate the installation of valve 10 into the pipeline.

As most particularly illustrated in FIG. 2, end connectors 14 have an interior flanged portion 20. Each interior flange 20 additionally has a neck portion 15 outwardly depending therefrom in confronting relationship with a counterbored portion 13 located in the ends of valve body 12. Valve body 12 is captured between inner flanges 20 of end connectors 14 and is retained therein by a plurality of bolts 24 that extend through a plurality of corresponding holes 22 provided in each inner flange portion 20. A lock washer 26 and nut 28 is threaded onto each bolt 24 until both inner flange portions 20 contact valve body 12. Valve body 12 acts in concert with end connectors 14 to define a valve chamber 40. An O-ring 30 is provided in an annular groove 32 located in neck portion 15 of each interior flange 20 in order to achieve a fluid-tight seal between end connectors 14 and valve body 12. We have found that the outer edge of counterbored portion 13 should be slightly angled to aid in the insertion of neck portion 15 over O-ring 30 and to provide additional room for O-ring 30 to expand during high temperature applications. In addition, the annular groove 32 is slightly wider in cross-section than the width of the O-rings 30 when in a contracted state to permit sufficient room for expansion of the O-rings when subjected to heat in use. In the preferred embodiment, O-rings 30 are fabricated from Viton B rubber having a useful temperature range of about 400° to 450° F. However, it will be understood that O-rings 30 may be fabricated from any suitable material that is compatible with the liquid medium being handled and that has a coefficient of expansion that is somewhat similar to or greater than the coefficient of expansion for the material used to fabricate valve body 12 and end connectors 14. When subjected to sufficiently high temperatures, the valve body 12 and the end connectors 14 will expand. The O-rings 30 preferably expand at a somewhat greater rate when subjected to such high temperatures. The wider dimensions of the annular grooves 32 accommodate the expansion of both the end connectors 14 and the O-rings 30.

A flow control member, or ball, 42, having an axial port 44 therethrough, is rotatably received within valve chamber 40. Port 44 extends along axis A—A to substantially correspond with bores 18 located in end connectors 14. Flow control member 42 is preferably constructed out of stainless steel, however, flow control member 42 may be fabricated out of any suitable machinable materials having properties that are compatible with the fluid medium being handled. A valve seat 34, is provided within a grooved recess 36 located in each end fitting 14. Valve seats 34 support flow control member 42 within valve chamber 40 and serve to seal the joint between flow control member 42 and valve body 12. Valve seats 34 are preferably fabricated from a carbon fiber polyetherether ketone material, such as that sold under the trademark Arlon 1555. However, any suitable valve seat material that is compatible with the liquid medium being handled and having a coefficient of expansion similar to the coefficient of expansion of the material making up valve body 12 and end connectors 14 will suffice.

Valve stem 60, having a circular cross-section, has a threaded upper portion 64, and a smooth bearing portion 68. A rectangular tab portion 62 depends from one end thereof to be received in a rectangular socket 46 located in the top of flow control member 42. A circular flange 70 is provided between rectangular tab 62 and bearing portion 68 of valve stem 60.

To accommodate valve stem 60 and provide support therefor, valve body 12 has an enlarged bonnet portion 50 located on the stem side of valve 10. Bonnet 50 has an axial bore 52 extending therethrough from one side of the valve chamber 40 along axis B—B that is proportioned to receive valve stem 60 and packing seals 72 and 72' therethrough. As most particularly shown in FIG. 2, packing seals 72 and 72' each have an axial bore 74 therethrough adapted to be slidably received along bearing portion 68 of valve stem 60. Packing seals 72 and 72' are preferably constructed out of a somewhat flexible material having a relatively low coefficient of friction such as Teflon, however, packing seals 72 and 72' may be fabricated out of more rigid materials such as brass or bronze to provide additional axial support to valve stem 60.

To properly align packing seals 72 and 72' along bearing portion 68 of stem member 60 and to provide axial support therefor, each packing seal 72 and 72' has a flange 76 extending around one end thereof. Flanges 76 of packing seal 72 and 72' are slidably received in corresponding enlarged axial bores, or counterbores, 78 and 80, located in bonnet 50. As can be seen in FIG. 2, counterbore 78 is adapted to receive flange 70 of valve stem 60 and flange 76 of packing seal 72'. Similarly, counterbore 80 is adapted to receive flange 76 of packing seal 72. The flange portions 76 of the packing seals 72 and 72' have a thickness X. The seals 72, 72' are configured so that the portion of packing seal 72 which extends into the bore 52 is separated from the corresponding portion of packing seal 72' a distance at least 2X along valve stem 60. The distance 2X allows packing seals 72 and 72' to expand along valve stem 60 unimpeded. Packing seal 72 is forced against the bottom of counterbore 80 by followers 82 and 82' working in conjunction with a plurality of spring washers 86. As can be seen in FIG. 2, followers 82 and 82' each have an axial bore 84 therein for sliding engagement with bearing portion 68 of valve stem 60. In addition, follower 82' is slidably received within axial counterbore 80 to provide axial support to valve stem 60 as it is rotated. In the preferred embodiment, three spring washers 86 are used, however, it will be apparent to those of ordinary skill in the art that the number of spring washers 86 can be varied to acquire any amount of spring force desired.

A handle member 90 is slidably and non-rotatably received on threaded portion 64 of valve stem 60 and is retained thereon by stem nut 92. By tightening stem nut 92 on threaded portion 64, handle 90 is brought to bear against follower 82. This action causes spring washers 86 to bear against follower 82' which ultimately compresses packing seal 72 into the bottom of counterbore 80 thereby creating a fluid-tight seal between packing seal 72 and valve body 12. The spring washers 86 also compress packing seal 72' into the counterbore 78 to create a fluid-tight seal between packing seal 72' stem member 60 and valve body 12. The packing seals 72, 72' thereby create a double seal effect not heretofore used to seal the stem of a ball valve.

The ball valve 10 of the present invention is operated by rotating flow control member 42 within valve chamber 40 between open and closed positions to control the flow of liquid through port 44. Flow control member 42 can be rotated manually by turning handle 90 or, in the alternative, may be automatically operated by various automated rotary actuators known in the art. To aid in the opening and closing of the ball valve 10, handle 90 has stop members 93 and 93' perpendicularly depending therefrom for engagement with an upstanding portion 54 of bonnet 50 when flow control member 42 is in the fully opened position. When automated actuators are used, the configuration of bonnet 50 will be varied in a known manner to eliminate handle 90 and stop member 54 to accommodate the particular actuator used.

As hot fluid enters ball valve 10, flow control member 42 is free to expand within valve chamber 40. As flow control member 42 expands, it forces flange member 70 against flange 76 of packing seal 72' to thereby create a fluid-tight seal between valve stem 60 and bonnet 50 of valve body 12. In addition, O-rings 30 are caused to expand within and out of annular grooves 32 to compensate for the expansion of valve body 20 and thereby maintain a fluid-tight seal between valve body 12 and end connectors 14. When a cooler liquid is introduced into ball valve 10, O-rings 30 will contract back to their original size within annular grooves 32, while still maintaining a fluid-tight seal between end connectors 14 and valve body 12.

The ball valve 10 of the present invention was tested as follows The ball valve 10 was heated to 400° F. for about 2½ to 3 hours, then immediately quenched in cold water to rapidly cool the valve. The foregoing procedure to simulate temperature extremes was performed five times with the ball valve 10 in the open position and five times with the ball valve 10 in the closed position. In each of the ten tests, there were no leaks when the ball valve 10 was cycled. Leaks have been observed in conventional ball valves, such as the one shown in FIG. 1, after a single cycle when subjected to similar temperature swings.

It will be understood that various changes in the details, materials and arrangements of parts which have been herein described and illustrated in order to explain the nature of the invention, may be made by those skilled in the art within the principle and scope of the invention as expressed in the appended claims.

We claim:

1. A ball valve comprising:
   a body member defining a first bore therethrough having at least two open ends;
   a first end connector and a second end connector, each positioned on one of said open ends of said valve body and each defining a seat receiving surface in generally confronting relationship relative to said open ends of said bore;
   a flow control member having an opening therethrough rotatably mounted within said valve body for regulating fluid flow through said bore of said valve body;
   seat members positioned on said seat receiving surfaces for maintaining the position of said flow control member within said valve body and providing a fluid-tight seal therebetween, said seat members being made of a material which expands and contracts at about the same rate as said flow control member and said first and second end connectors;
   a stem member operatively connected to said flow control member for rotating said flow control member between open and closed positions within said valve body; and
   a plurality of sealing means for providing a fluid-tight seal between said first and second end connectors and said ends of said valve body.

2. The ball valve recited in claim 1 wherein said first and second end connectors each receive at least one said sealing means and are configured to permit expansion of said sealing means while maintaining said fluid tight seal.

3. The ball valve recited in claim 2 wherein each end of said first bore of said valve body has a counterbore and each of said first and second end connectors has a neck which is received by one of said counterbores of said valve body, each neck having an annular external groove in confronting relationship with the interior surface of the one of said counterbores in which said neck is received for receiving said sealing means.

4. The ball valve recited in claim 3 wherein said sealing means comprises an O-ring positioned in each said annular groove of each said neck and each said annular groove being wider in cross-section than the cross-sectional width of the O-ring in said annular groove.

5. The ball valve recited in claim 1 further comprising packing seal means for providing a fluid-tight seal and axial and radial bearing support between said stem member and said valve body, said packing seal means being slidably received on said stem member to compensate for the axial movement of said stem member due to the expansion and contraction of said flow control member and said valve body while maintaining said fluid-tight seal.

6. The ball valve recited in claim 5 wherein said valve body defines a second bore extending substantially transversely from one side of said first bore of said valve body, said second bore having a counterbore at each end thereof and receiving said stem member therethrough, and said packing seal means comprising a plurality of flanged seals slidably received in said second bore of said valve body for surrounding said stem member.

7. The ball valve recited in claim 6 further comprising means for biasing said flanged seals against said counterbores of said second bore to create a fluid-tight seal therebetween.

8. The ball valve recited in claim 7 wherein said biasing means comprise upper and lower follower members and a plurality of spring washers slidably received on said stem member, said spring washers being captured between said upper and lower follower members.

9. The ball valve recited in claim 1 further comprising actuating means operatively connected to said stem member for rotation thereof.

10. A ball valve as recited in claim 9, wherein said actuating means comprises a handle member slidably and non-rotatably received on said stem member.

11. A ball valve comprising:
    a valve body defining a first bore therethrough having at least two open ends and a second bore extending transversely from one side of said first bore and having counterbores at each end thereof;
    a flow control member having an opening therethrough rotatably mounted within said first bore of said valve body for regulating fluid flow through said first bore;
    a stem member extending through said second bore operatively connected at one end thereof to said flow control member for rotating said flow control member between open and closed positions within said first bore of said valve body;
    packing seal means for providing a fluid-tight seal and axial and radial bearing support between said stem member and said second bore of said valve body said packing seal means comprising at least two seals, each having a first portion received in said second bore and a flanged portion received within one of said counterbores; and
    means for biasing said packing seal means into a position for maintaining a fluid-tight sealing relationship.

12. The ball valve recited in claim 11 wherein said flanged portions of said seals have a thickness X and said first portions of said at least two seals are spaced from each other within said second bore by a distance of at least 2X.

13. The ball valve recited in claim 11 wherein said biasing means is at least partially positioned within one said counterbore of said second bore against said flanged portion of one said seal.

14. The ball valve recited in claim 11 wherein said biasing means comprise upper and lower follower members and a plurality of spring washers slidably received on said stem member captured between said upper and lower follower members.

15. The ball valve recited in claim 11 wherein said packing seal means are made of a tetrafluoroethene material.

* * * * *